US011279396B2

(12) United States Patent
Dubay et al.

(10) Patent No.: US 11,279,396 B2
(45) Date of Patent: Mar. 22, 2022

(54) ENERGY ABSORBING STRAP ASSEMBLY FOR A STEERING COLUMN

(71) Applicant: Steering Solutions IP Holding Corporation, Saginaw, MI (US)

(72) Inventors: Kurt D. Dubay, Merrill, MI (US); Leslie E. Edmundson, Clio, MI (US); Anthony R. Talhelm, Flint, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 29 days.

(21) Appl. No.: 16/846,977

(22) Filed: Apr. 13, 2020

(65) Prior Publication Data

US 2021/0316779 A1 Oct. 14, 2021

(51) Int. Cl.
*B62D 1/19* (2006.01)
*B62D 1/185* (2006.01)

(52) U.S. Cl.
CPC .............. *B62D 1/192* (2013.01); *B62D 1/185* (2013.01)

(58) Field of Classification Search
CPC ................................ B62D 1/192; B62D 1/185
See application file for complete search history.

(56) References Cited

U.S. PATENT DOCUMENTS

| 10,967,900 | B2 * | 4/2021 | Pichonnat | F16F 7/125 |
| 11,052,936 | B2 * | 7/2021 | Gosztyla | B62D 1/185 |
| 2007/0194563 | A1 * | 8/2007 | Menjak | B62D 1/195 |
| | | | | 280/777 |
| 2007/0228716 | A1 * | 10/2007 | Menjak | B62D 1/195 |
| | | | | 280/777 |
| 2015/0232117 | A1 * | 8/2015 | Stinebring | B62D 1/195 |
| | | | | 74/493 |
| 2016/0244015 | A1 * | 8/2016 | Dubay | B60R 21/02 |
| 2016/0368524 | A1 * | 12/2016 | Tinnin | B62D 1/192 |
| 2019/0126968 | A1 * | 5/2019 | Messing | B62D 1/181 |
| 2019/0225255 | A1 * | 7/2019 | Ishimura | B62D 1/181 |

FOREIGN PATENT DOCUMENTS

| DE | 102016220531 A1 * | 4/2018 | ............. B62D 1/192 |
| WO | WO-2018178168 A1 * | 10/2018 | ............. F16F 7/125 |

* cited by examiner

*Primary Examiner* — Drew J Brown
(74) *Attorney, Agent, or Firm* — Dickinson Wright PLLC

(57) ABSTRACT

A steering column includes an upper jacket. The steering column also includes a lower jacket that the upper jacket is telescopingly coupled to. The steering column further includes an energy absorbing strap directly coupled to the upper jacket with at least one mechanical fastener.

14 Claims, 2 Drawing Sheets

ENERGY ABSORBING STRAP ASSEMBLY FOR A STEERING COLUMN

FIELD OF INVENTION

The embodiments disclosed herein relate to vehicle steering column assemblies and, more particularly, to an energy absorbing strap assembly.

BACKGROUND

On adjustable steering columns, energy absorbing straps are utilized to absorb an occupant's mass during a collapse event of the steering column. Push style energy absorbing straps have additional components that form a complex overall assembly, such as the assembly shown in FIG. 1. These additional components and features are required to attach the energy absorbing strap to an upper jacket and to provide an anti-rotation feature between the upper jacket and a lower jacket. These components and features lead to a complex assembly operation.

FIG. 1 shows an example of a prior design that includes some of the above-described issues. The steering system 10 in FIG. 1 includes an upper jacket 14 that telescopes with a lower jacket 16. An energy absorbing strap assembly 20 includes an energy absorbing strap 22 that is indirectly coupled to the upper jacket 14. This is done with a screw that extends through an extruded tapped hole in the upper jacket. An eccentric cam 24 and an eccentric spring 26 require an eccentric pivot bracket 27 to secure the eccentric cam 24 to the lower jacket 16. Additionally, two bumper pads 28 are needed to engage with telescope stop tabs. Additionally, multiple components 30 are employed to provide an anti-rotation feature between the upper jacket 14 and the lower jacket 16.

SUMMARY OF THE DISCLOSURE

According to one aspect of the disclosure, a steering column includes an upper jacket. The steering column also includes a lower jacket that the upper jacket is telescopingly coupled to. The steering column further includes an energy absorbing strap directly coupled to the upper jacket with at least one mechanical fastener.

According to one aspect of the disclosure, an energy absorbing strap assembly includes an energy absorbing strap having a pair of tabs extending therefrom and having a set of teeth formed thereon. The energy absorbing strap assembly also includes a stop feature disposed between the pair of tabs, wherein engagement of the stop feature with each of the pair of tabs provides telescope travel stops. The energy absorbing strap assembly further includes an eccentric cam pivotable to selectively engage the set of teeth, wherein the energy absorbing strap assembly does not include an eccentric cam bracket.

These and other advantages and features will become more apparent from the following description taken in conjunction with the drawings.

BRIEF DESCRIPTION OF DRAWINGS

The subject matter that is regarded as the subject invention is particularly pointed out and distinctly claimed in the claims at the conclusion of this specification. The foregoing and other features and advantages of the invention are apparent from the following detailed description of non-limiting exemplary embodiments of the invention taken in conjunction with the accompanying drawing thereof in which:

DETAILED DESCRIPTION

Referring now to the Figures, wherein like numerals indicate corresponding parts, the subject invention is described below with reference to specific non-limiting embodiments thereof. The embodiments described herein relate to an energy absorbing assembly associated with a steering column (also referred to herein as a "steering column assembly"). The steering column may be utilized in numerous types of vehicles.

Figure 2:
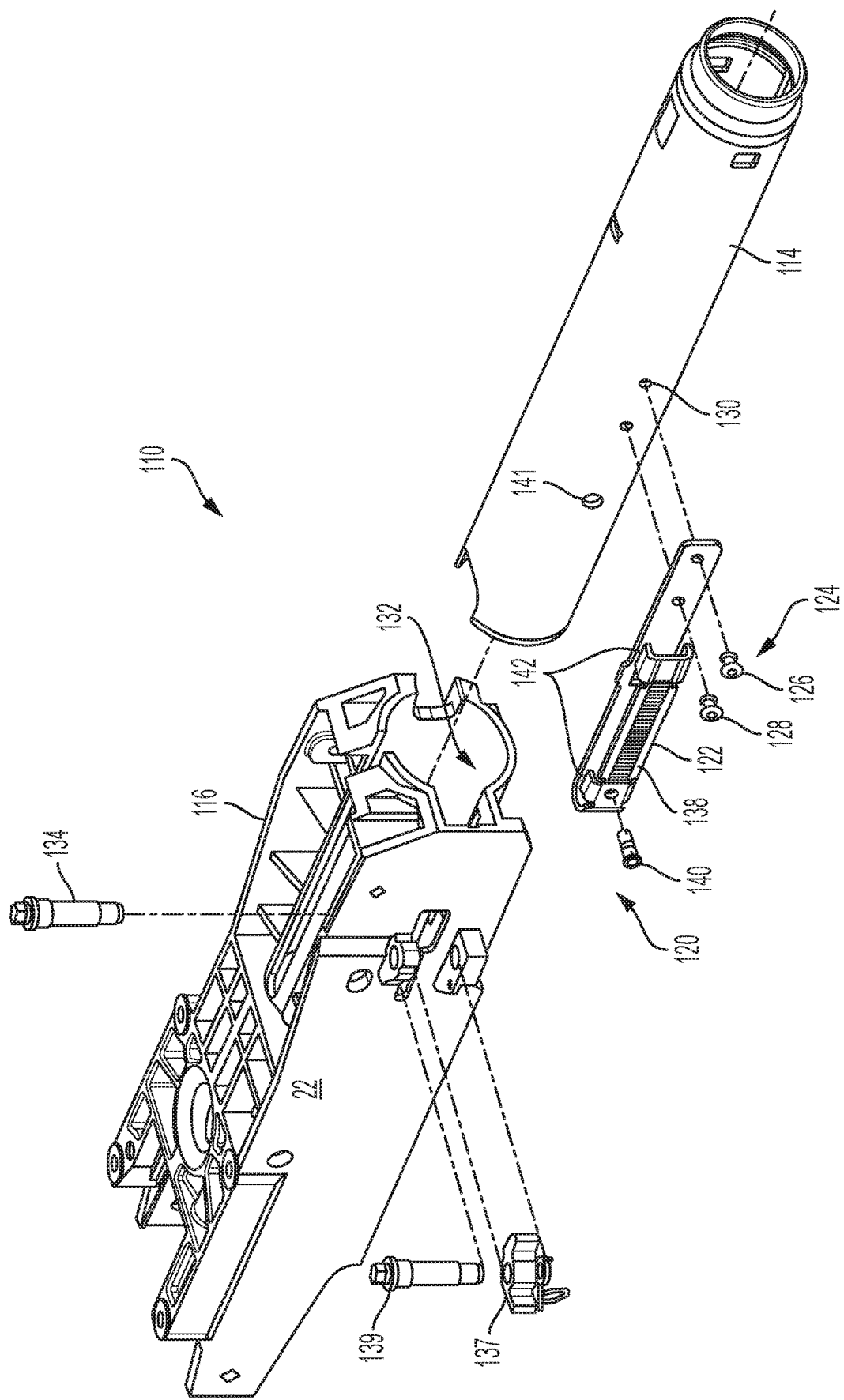
FIG. 2 is a perspective, partially disassembled view of an energy absorbing strap assembly according to the embodiments disclosed herein.

Referring to FIG. 2, the steering column is illustrated and generally referenced with numeral 110. The steering column 110 substantially extends along a longitudinal axis "A." The steering column 110 is adjustable in a telescopic direction parallel to the longitudinal axis "A" (i.e., the steering column 110 is axially adjustable along the longitudinal axis "A"). More specifically, the steering column includes a steering shaft (not shown) rotatably disposed within a column assembly that includes an upper jacket 114 and a lower jacket 116. The steering shaft may be one of a plurality of operatively coupled steering shafts in some embodiments. A steering wheel (not shown) is configured to be mounted to the steering shaft. The column jackets 114, 116 and the steering shaft substantially extend along the longitudinal axis "A." The upper jacket 114 is movable, relative to the lower jacket 116, during a normal operating condition of the vehicle to telescopically adjust a position of the steering wheel along the longitudinal axis "A." The normal operating condition (also referred to herein as a first condition of the steering column) is defined as a normal driving condition that allows adjustment of the upper jacket 114 over a predefined range of telescoping movement that is suitable for driving.

The steering column 110 is also operable in a second operating condition defined as a collapse of the upper jacket 114 during an energy absorbing event. In this condition, energy-absorbing movement (i.e., energy absorbing collapsibility) of the upper jacket 114 along the longitudinal axis "A" within the lower jacket 116 is provided. To assist with the energy absorbing process during a collapse event, and to reduce the number of components and assembly complexity, an energy absorbing strap assembly is disclosed herein. The energy absorbing strap assembly is generally referenced with numeral 120.

The energy absorbing strap assembly 120 includes an energy absorbing strap 122 that is directly coupled to the upper jacket 114 with one or more mechanical fasteners 124. In the illustrated embodiment, the mechanical fastener(s) comprises a first rivet 126 and a second rivet 128. The precise location of securement of the rivets 126, 128 to the upper jacket 114 may vary depending upon the particular application and on various design factors. The illustrated embodiment shows a pair of apertures 130 that the rivets 126, 128 respectively couple with. This direct coupling of the energy absorbing strap 122 to the upper jacket 114 replaces the need for a screw and extruded tapped screw hole that is shown in FIG. 1.

The energy absorbing strap assembly 120 also includes a pair of tabs 142 on the energy absorbing strap 122. The tabs 142 interface with a slot 132 defined by the lower jacket 116. The interaction between the tabs 142 and the walls that define the slot 132 provide resistance to rotation of the energy absorbing strap 122. A bolt 134 interfaces with the tabs 142 of the energy absorbing strap 122 to define telescope travel stops. The telescope travel stops define a range of motion of the upper jacket 114 during normal operation of the steering column 110. The bolt 134 also supports a portion of the energy absorbing strap 122 to allow an eccentric cam 137 to engage into teeth 138 formed on the energy absorbing strap 122. This engagement maintains the energy absorbing strap 122 in place during collapse of the steering column 110. A pivot bolt 139 defines an axis of rotation that the eccentric cam 137 rotates about to move into and out of engagement with the teeth 138 of the strap 122.

A tab (not shown) on the back side of the energy absorbing strap 122 protrudes into a hole 141 on the upper jacket 114 to take up axial loading during collapse. A breakaway feature 140 on the energy absorbing strap 122 provides an additional load feature during initial an initial stage of a collapse event. In other words, the initial dynamics of a collapse event are managed by the axial load characteristics of the breakaway feature 140.

Figure 1:
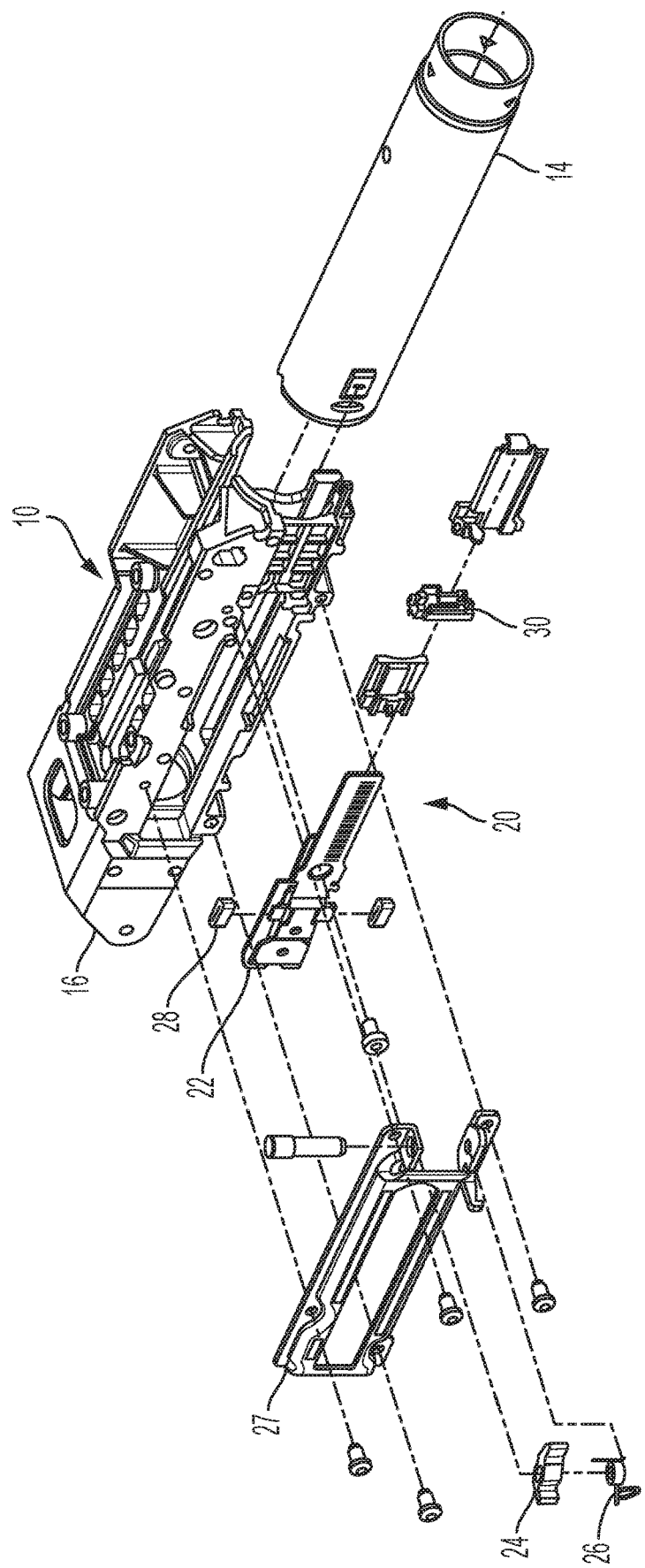
FIG. 1 is a perspective, partially disassembled view of an energy absorbing strap assembly according to a prior art example.

The embodiments disclosed herein require fewer structural components and mechanical fasteners when compared to prior energy absorbing strap assembly designs, such as the example of FIG. 1. For example, the eccentric pivot bracket, the individual bumper pads and the extruded tapped hole in the upper jacket have been eliminated in the embodiments disclosed herein.

The reduction of components and the direct coupling of various components provide a more efficient and less complex assembly process, as the energy absorbing strap assembly 120 incorporates an anti-rotation feature, telescope stops and initial energy absorbing breakaway features into a single structural system.

While the invention has been described in detail in connection with only a limited number of exemplary embodiments, it should be appreciated that the invention is not limited to such embodiments. Rather, the invention can be modified to incorporate any number of variations, alterations, substitutions, or equivalent arrangements not heretofore described, but that are commensurate with the spirit and scope of the invention. Additionally, while various non-limiting exemplary embodiments of the invention have been described, it should be appreciated that aspects of the invention may include only some of these embodiments. Accordingly, the invention is not to be seen as limited by the foregoing description.

Having thus described the invention, it is claimed:

1. A steering column comprising:
   an upper jacket;
   a lower jacket that the upper jacket is telescopingly coupled to;
   an energy absorbing strap directly coupled to the upper jacket with at least one mechanical fastener; and
   at least one tab extending from the energy absorbing strap and disposed within a slot at least partially defined by an inner wall of the lower jacket, the at least one tab resisting rotation of the energy absorbing strap.

2. The steering column of claim 1, wherein the energy absorbing strap is riveted to the upper jacket.

3. The steering column of claim 2, wherein the energy absorbing strap is riveted to the upper jacket with a first rivet and a second rivet.

4. The steering column of claim 1, wherein the at least one tab comprises a pair of tabs.

5. The steering column of claim 4, further comprising a stop feature disposed between the pair of tabs, wherein engagement of the stop feature with each of the pair of tabs provides telescope travel stops.

6. The steering column of claim 5, wherein the stop feature comprises an overmolded bolt.

7. The steering column of claim 1, further comprising a breakaway feature on the energy absorbing strap and engaged with the upper jacket.

8. The steering column of claim 1, wherein the steering column does not include an eccentric cam bracket.

9. An energy absorbing strap assembly comprising:
   an energy absorbing strap having a pair of tabs extending therefrom and having a set of teeth formed thereon;
   a stop feature disposed between the pair of tabs, wherein engagement of the stop feature with each of the pair of tabs provides telescope travel stops; and
   an eccentric cam pivotable to selectively engage the set of teeth, wherein the energy absorbing strap assembly does not include an eccentric cam bracket.

10. The energy absorbing strap assembly of claim 9, wherein the energy absorbing strap is directly coupled to an upper jacket of a steering column.

11. The energy absorbing strap assembly of claim 10, wherein the energy absorbing strap is riveted to the upper jacket.

12. The energy absorbing strap assembly of claim 11, wherein the energy absorbing strap is riveted to the upper jacket with a first rivet and a second rivet.

13. The energy absorbing strap assembly of claim 9, wherein the pair of tabs are disposed within a slot at least partially defined by an inner wall of the lower jacket, the tabs resisting rotation of the energy absorbing strap.

14. The energy absorbing strap assembly of claim 9, further comprising a breakaway feature on the energy absorbing strap.

* * * * *